Sept. 29, 1959   J. E. A. GAULD   2,906,985
ELECTRICAL JUNCTION BOXES
Filed Oct. 26, 1956   2 Sheets-Sheet 1

United States Patent Office 2,906,985
Patented Sept. 29, 1959

2,906,985

ELECTRICAL JUNCTION BOXES

John Edward Alec Gauld, Baginton, Coventry, England, assignor to Sir W. G. Armstrong Whitworth Aircraft Limited, Baginton, Coventry, England Application October 26, 1956, Serial No. 618,488

Claims priority, application Great Britain December 10, 1955

6 Claims. (Cl. 339—18)

This invention relates to electrical junction boxes particularly, but not exclusively, for use in aircraft.

With conventional junction boxes it is necessary to remove the boxes from the aircraft to make wiring changes, and it is an object of this invention to provide an improved junction box in which the whole box need not be removed and permanent wiring need not be disturbed when making wiring modifications.

An incidental object of the invention is to provide a box in which the said permanent wiring is impregnated with a suitable non-conducting compound so as to increase the degree of insulation between fixed terminals in the box.

According to the invention the junction box is provided with a plurality of fixed terminal sockets which are wired, for example, to conventional plug sockets fixed to the walls of the box, the wiring between the terminal sockets and the plug sockets being impregnated with a suitable non-conducting compound, the box having at least one removable connector unit which includes a number of terminal plugs corresponding to the terminal sockets; means being provided for varying the interconnection of the terminal plugs whereby a change in the wiring of the box can be made by removing a connector unit from the box and making appropriate alterations in the said means.

Preferably the said means for varying the interconnection of the terminal plugs comprises a plurality of bus-bars, split metallic collets, and links.

Preferably, also, the terminal sockets are supported in a block of insulating material, such as nylon, and the terminal plugs and bus-bars are supported in a connector moulding, also of insulating material such as nylon, forming part of the removable connector unit.

Figure 1:
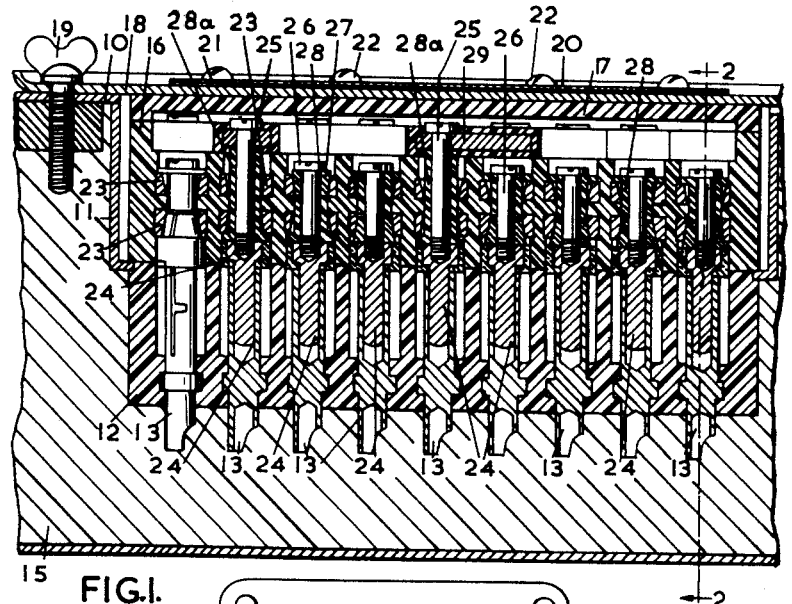
Figure 1 is an enlarged longitudinal section through a portion of the junction box embodying the invention, the section being taken on line 1—1 of Figure 3.
Figure 3:
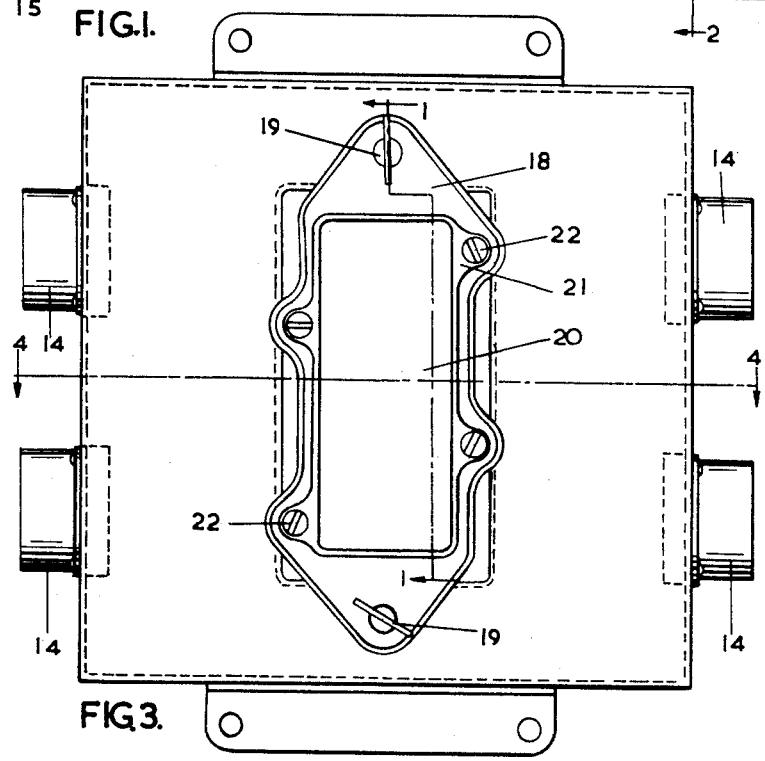
Figure 3 is a plan of the same box.

The box shown in Figures 1 to 4 consists of a metal casing 10 which is provided with depending flanged walls. The flanged walls 11 support a nylon block 12 in which are embedded four rows of nine terminal sockets 13.

In the walls of the casing 10 are fixed conventional plug sockets 14, and permanent wiring 13a (Figure 4) is effected between the terminal sockets 13 and the plug socket 14. If desired permanent wiring can also be effected between any of the plug sockets 14, this being wiring which is not expected to be varied.

Figure 2:
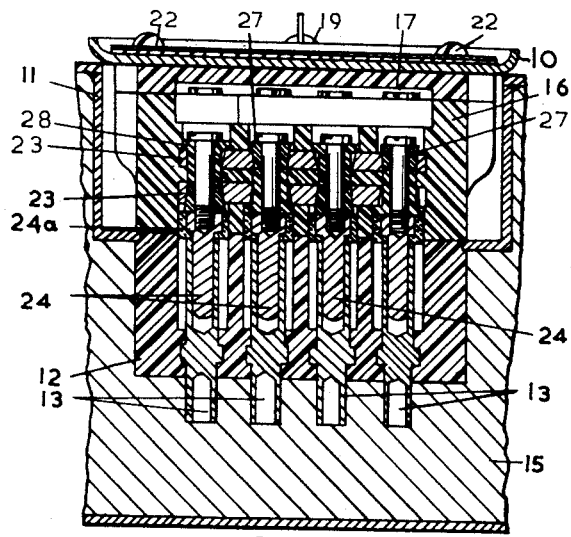
Figure 2 is an enlarged section on line 2—2 of Figure 1.
Figure 4:
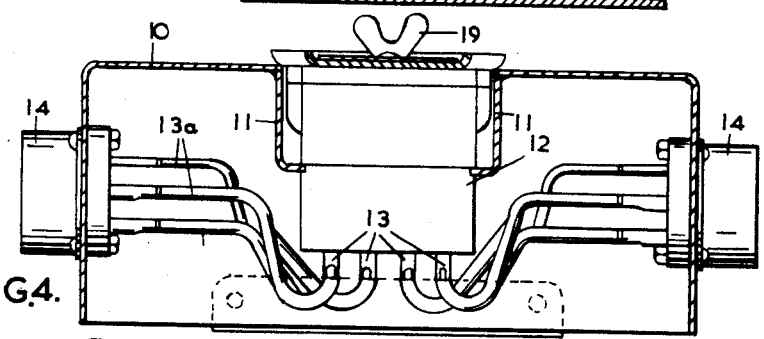
Figure 4 is a section on line 4—4 of Figure 3.

When the wiring is completed the box is filled with an insulating material so that the wiring is completely impregnated by the insulating material (a non-conducting compound such as resin) shown at 15 in Figures 1 and 2.

The removable connector unit consists of a moulding 16, an insulator plate 17 and a metal plate 18. The metal plate 18 is provided with holes through which extend captive butterfly screws 19 by which the connector unit is clamped in position as shown in the drawings. The metal plate 18 is provided with a perspex window 20 held in place by a metal frame 21 in turn held in place by screws 22 passing through metal plate 18, insulating plate 17 and screwing into the moulding 16.

A circuit diagram can be placed beneath a perspex window 20 so as to provide visible indication of the circuit arrangement within the connector unit.

In the connector moulding 16 are a plurality of pairs of bus-bars 23 and coaxial with bores in the bus-bars 23 are thirty-six terminal plugs 24. The plugs 24 are each provided with an insulator bush 24a which is keyed. Each plug 24 can be connected to one or both of the bus-bars 23 by means of a split metallic collet 27. The plug 24 can be insulated from one of the bus-bars 23 by an insulator sleeve 28, or from both of the bus-bars by a long insulator sleeve 28a. To interconnect a terminal plug 24 of one row with a terminal plug 24 of another row an insulated link 29 is provided. The collets 27 and sleeves 28, and the links 29 and sleeves 28a, are secured to the plugs 24 with screws 26 and 25 respectively.

Any combination of short and long sleeves 28, 28a, split collets 27 and links 29 of varying shapes and sizes can be used to interconnect the terminal plugs 24 in any desired manner.

If a change in the wiring of a junction box becomes necessary, the connector unit is removed as a whole (by undoing butterfly screws 19 and withdrawing the unit) without disturbing the nylon block 12, terminal sockets 13, or the permanent wiring in the box. By replacing split collets 27 by insulator sleeves 28 and vice versa, and by varying the links 29 it is possible to interconnect the terminal plugs 24 in any desired manner so as to re-arrange the circuitry of the box without removing the box from its position and without disturbing any permanent wiring.

All desired changes in the circuitry can be made by unscrewing the long and short screws 25 and 26 respectively, and removing sleeves and collets as necessary, removing and replacing the links as necessary. The whole operation can be carried out with the use of a screwdriver only.

The connector unit can be taken away to a bench in a workshop to make the wiring changes, thus avoiding the necessity of working in a confined space, for example, in an aircraft.

Figure 5:
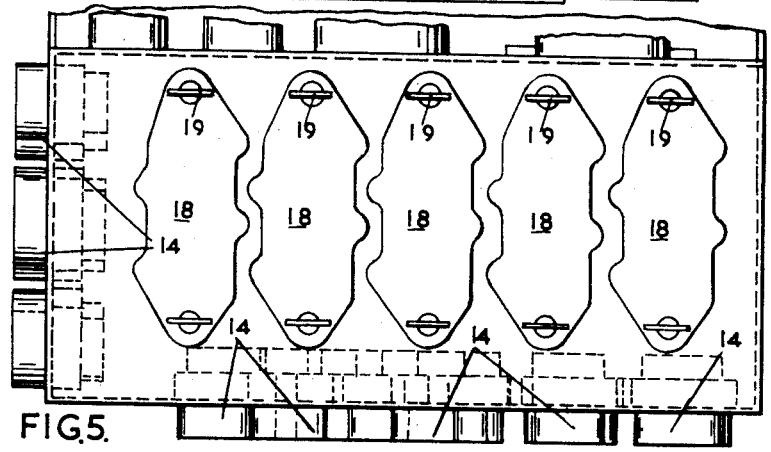
Figure 5 is a diagrammatic plan view of an alternative junction box embodying the invention, the box incorporating five removable connector units.

In Figure 5 a junction box is shown in which there are five removable connector units and, diagrammatically, a number of fuse-boxes, relays and the like are also shown which can be included in the permanent wiring of the box, either to the plug sockets 14 or terminal sockets 13.

Any number of removable connector units can be used and the number of terminal sockets per connector unit can be varied if desired although it will be preferable to standardise the number and arrangement of terminal sockets.

As many as twenty or thirty different shapes and sizes of links can be provided so that any interconnecting arrangement can be adopted.

What I claim as my invention and desire to secure by Letters Patent of the United States is:

1. An electrical junction box comprising a plurality of walls defining an enclosed region, one of said walls having therein a recess bounded by a continuous periphery, a plurality of terminal sockets mounted in the recessed part of said one wall, said terminal sockets being accessible only from within said recess, a plurality of plug sockets mounted in a wall at locations remote from said recess, wiring positioned within said enclosed region and connecting each of said terminal sockets to a corresponding plug socket, a non-conducting substance, impregnating said wiring and substantially filling said enclosed region, and a removable connector unit positioned within said recess, said connector unit comprising an enclosed housing positioned wholly within said recess, a plurality of terminal plugs corresponding in number to said terminal sockets and mounted in said housing, said terminal plugs extending from said housing for insertion in said terminal sockets, and means within said housing and connecting in a desired manner said terminal plugs, said connector unit being removable from said recess and said means being adjustable, whereby to effect appropriate alterations to the connectors between said terminal plugs.

2. An electrical junction box comprising a plurality of walls defining an enclosed region, one of said walls having therein a recess bounded by a continuous perpihery, a plurality of terminal sockets mounted in the recessed part of said one wall, said terminal sockets being accessible only from within said recess, a plurality of plug sockets mounted in a wall at locations remote from said recess, wiring positioned within said enclosed region and connecting each of said terminal sockets to a corresponding plug socket, a non-conducting substance, impregnating said wiring and substantially filling said enclosed region, a removable connector unit positioned within said recess and closure means for said recess, said connector unit comprising an enclosed housing positioned wholly within said recess, a plurality of terminal plugs corresponding in number to said terminal sockets and mounted in said housing, said terminal plugs extending from said housing for insertion in said terminal sockets, and means within said housing and connecting in a desired manner said terminal plugs, said connector unit being removable from said recess and said means being adjustable, whereby to effect appropriate alterations to the connectors between said terminal plugs.

3. An electrical junction box comprising a plurality of walls defining an enclosed region, one of said walls having therein a recess bounded by a continuous perpihery, a plurality of terminal sockets mounted in the recessed part of said one wall, said terminal sockets being accessible only from within said recess, a plurality of plug sockets mounted in a wall at locations remote from said recess, wiring positioned within said enclosed region and connecting each of said terminal sockets to a corresponding plug socket, a non-conducting substance, impregnating said wiring and substantially filling said enclosed region, a removable connector unit positioned within said recess and closure means for said recess, said connector unit comprising an enclosed housing positioned wholly within said recess, a plurality of terminal plugs corresponding in number to said terminal sockets and mounted in said housing, said terminal plugs extending from said housing for insertion in said terminal sockets, and means within said housing and connecting in a desired manner said terminal plugs, said means including a plurality of bus-bars, split collets, insulation sleeves and links, said connector unit being removable from said recess, whereby to effect appropriate alterations to the connections between said terminal plugs.

4. An electrical junction box comprising a plurality of walls defining an enclosed region, one of said walls having therein a recess bounded by a continuous periphery, a plurality of terminal sockets mounted in the recessed part of said one wall, said terminal sockets being accessible only from within said recess, a plurality of plug sockets mounted in a wall at locations remote from said recess, wiring positioned within said enclosed region and connecting each of said terminal sockets to a corresponding plug socket, a non-conducting substance, impregnating said wiring and substantially filling said enclosed region, a removable connector unit positioned within said recess and closure means for said recess, said connector unit comprising an enclosed housing positioned wholly within said recess, a plurality of terminal plugs corresponding in number to said terminal sockets and mounted in said housing, said terminal plugs extending from said housing for insertion in said terminal sockets, and means within said housing and connecting in a desired manner said terminal plugs, said means including a plurality of conducting bus-bars, conducting metallic split collets, insulation sleeves and conducting links of different shapes and sizes, for varying interconnection of said terminal plugs and said connector unit being removable from said recess.

5. An electrical junction box comprising a plurality of walls defining an enclosed region, one of said walls having therein a recess bounded by a continuous periphery, a block of insulating material mounted in an aperture in the recessed part of said one wall, a plurality of terminal sockets mounted in said block, said terminal sockets being accessible only from within said recess, a plurality of plug sockets mounted in a wall at locations remote from said recess, wiring positioned within said enclosed region and connecting each of said terminal sockets to a corresponding plug socket, a non-conducting substance, impregnating said wiring and substantially filling said enclosed region, a removable connector unit positioned within said recess and closure means for said recess, said connector unit comprising an enclosed housing moulding of insulating material and positioned wholly within said recess, a plurality of terminal plugs corresponding in number to said terminal sockets and mounted in said housing, said terminal plugs extending from said housing for insertion in said terminal sockets, and means within said housing and connecting in a desired manner said terminal plugs, said connector unit being removable from said recess and said means being adjustable, whereby to effect appropriate alterations to the connectors between said terminal plugs.

6. An electrical junction box as claimed in claim 5 in which each connector unit further comprises a plurality of pairs of bus-bars embedded in said housing moulding, said bus-bars and moulding containing aligned holes, means for supporting said terminal plugs opposite the aligned holes, threaded members positioning said terminal plugs, said threaded members extending through said aligned holes.

References Cited in the file of this patent

UNITED STATES PATENTS

| Number | Name | Date |
|---|---|---|
| 1,691,877 | Alden | Nov. 13, 1928 |
| 1,718,529 | Coldwell | June 25, 1929 |
| 1,788,567 | Egger | Jan. 13, 1931 |
| 1,910,686 | Frank | May 23, 1933 |
| 1,923,939 | Lavarack | Aug. 22, 1933 |
| 2,052,272 | Auth | Aug. 25, 1936 |
| 2,157,428 | Obszarny | May 9, 1939 |
| 2,167,209 | Huskey | July 25, 1939 |
| 2,692,373 | Werner | Oct. 19, 1954 |
| 2,737,579 | Wehrlin | Mar. 6, 1956 |
| 2,793,354 | Heimbach | May 21, 1957 |

FOREIGN PATENTS

| Number | Country | Date |
|---|---|---|
| 396,993 | Great Britain | Aug. 17, 1933 |